W. E. WEEKES.
RAIL JOINT.
APPLICATION FILED OCT. 7, 1911.
1,030,695.
Patented June 25, 1912.
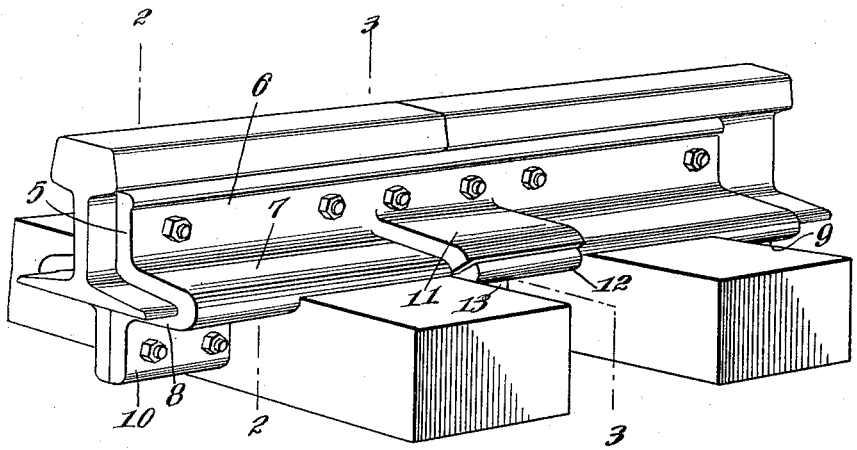
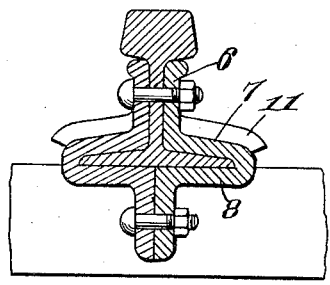 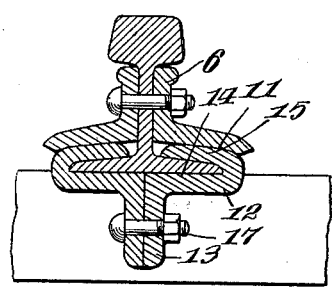
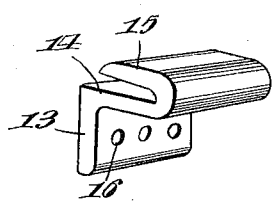
Inventor
William E. Weekes
Witnesses
By Victor J. Evans
Attorney

UNITED STATES PATENT OFFICE.

WILLIAM EDGAR WEEKES, OF ASHTON, IDAHO.

RAIL-JOINT.

1,030,695.   Specification of Letters Patent.   Patented June 25, 1912.

Application filed October 7, 1911. Serial No. 653,362.

*To all whom it may concern:*

Be it known that I, WILLIAM EDGAR WEEKES, a citizen of the United States, residing at Ashton, in the State of Idaho, have invented new and useful Improvements in Rail-Joints, of which the following is a specification.

This invention relates to improvements in rail joints, and the object of the invention is to provide a device of this character which is comparatively simple in construction, which may be made at a small cost and which performs the functions for which it is adapted with ease and with accuracy.

With the above, and other objects in view, which will be more apparent as the nature of the invention progresses, the invention resides in the novel construction and arrangement of parts hereinafter fully described and claimed.

In the drawings—Figure 1 is a perspective view of a pair of rails connected through the medium of my improved joint. Fig. 2 is a transverse sectional view upon the line 2—2 of Fig. 1. Fig. 3 is a similar sectional view upon the line 3—3 of Fig. 1. Fig. 4 is a detail perspective view of one of the filler members.

In the drawings, the numerals 1 designate the meeting ends of a pair of rails.

The numeral 5 designates the fish plates for the rail ends. Both of these fish plates are constructed in a similar manner and the designating characters referring to one of said plates may be understood as referring equally to the second plate. Each of the plates 5 comprises essentially a vertical longitudinally extending member 6. This vertical member is formed adjacent its lower side with an inclined flange 7. The inclination of the said flange 7 is similar to that of the base flanges of the rails and the said flange 7 is adapted to overlie and to contact with the said base flanges of the rails.

The numerals 8 and 9 designate integrally formed horizontally straight plates, the same underlying the plates 7, and each of the said plates 8 and 9 has its inner extremity formed with a downwardly extending vertical wall 10. The walls 10 as well as the plates 6 are each provided with a plurality of openings, the openings of one of the fish plates corresponding with similar openings in the second fish plate and the said openings being adapted for the reception of securing elements such as nuts and bolts, as shown in the drawing.

The flange member 7 of each of the fish plates at the central portion thereof is enlarged and undercut as indicated by the numeral 11. The undercut portions are adapted to receive chair members 12. These members each comprise a vertically straight wall 13 which is integrally formed with a horizontally straight wall 14, the wall 14 is integrally connected therewith to an angular overlying portion 15, and the space between the walls 14 and 15 is sufficient to snugly engage with the base flanges of the rails at their points of meeting. The vertical longitudinally extending wall of each of the chair members 12 is provided with a plurality of openings 16 which register and are adapted to receive securing elements 17.

Having thus fully described the invention, what I claim is:—

In combination with the meeting ends of a pair of railway rails, of angular fish plates for said rails, the said fish plates having their horizontal faces each provided with a depending portion, means for connecting the depending portions of the fish plates, the central portion of each of the fish plates being enlarged and cut away to provide a pocket, a chair member adapted to be received within each of the pockets of each of the fish plates, each of said chair members comprising a vertical member having an integrally formed horizontal wall, and the said horizontal walls each being provided with an angular overlying portion, the said overlying portion adapted to pass between the wall provided by the cut away portion and the horizontal member adapted to underlie the base flanges of the rail, so that the vertical members of the chairs are brought one against the other, and means for connecting the said vertical walls of the chairs, the horizontal member and the overlying portion adapted to engage with the base flanges of the rails, and means for securing the filler members, substantially as and for the purpose set forth.

In testimony whereof I affix my signature in presence of two witnesses.

WILLIAM EDGAR WEEKES.

Witnesses:
　　LOU HARSHBARGER,
　　JAS. R. LOGAN.

Copies of this patent may be obtained for five cents each, by addressing the "Commissioner of Patents, Washington, D. C."